(12) United States Patent
Wang et al.

(10) Patent No.: US 12,341,153 B2
(45) Date of Patent: Jun. 24, 2025

(54) DOPED PHOSPHORUS-SULFUR IODIDE SOLID ELECTROLYTE, PREPARATION METHOD THEREFOR, AND USE THEREOF

(71) Applicant: HENGDIAN GROUP DMEGC MAGNETICS CO., LTD, Jinhua (CN)

(72) Inventors: Guoguang Wang, Jinhua (CN); Cheng Shi, Jinhua (CN); Zhanzhou Wang, Jinhua (CN); Yisheng Jiang, Jinhua (CN); Yang Xia, Jinhua (CN); Jun Zhang, Jinhua (CN)

(73) Assignee: HENGDIAN GROUP DMEGC MAGNETICS CO., LTD, Jinhua (CN)

( * ) Notice: Subject to any disclaimer, the term of this patent is extended or adjusted under 35 U.S.C. 154(b) by 620 days.

(21) Appl. No.: 17/787,884

(22) PCT Filed: Jun. 4, 2020

(86) PCT No.: PCT/CN2020/094270
§ 371 (c)(1),
(2) Date: Jun. 21, 2022

(87) PCT Pub. No.: WO2021/128738
PCT Pub. Date: Jul. 1, 2021

(65) Prior Publication Data
US 2023/0041325 A1 Feb. 9, 2023

(30) Foreign Application Priority Data
Dec. 28, 2019 (CN) .......................... 201911384024.0

(51) Int. Cl.
*H01M 10/0562* (2010.01)
*C01B 25/14* (2006.01)

(52) U.S. Cl.
CPC ......... *H01M 10/0562* (2013.01); *C01B 25/14* (2013.01); *C01P 2002/52* (2013.01); *C01P 2002/72* (2013.01); *C01P 2006/40* (2013.01); *H01M 2300/008* (2013.01)

(58) Field of Classification Search
CPC ....... H01M 10/0562; H01M 2300/008; H01M 4/139; H01M 4/366; H01M 4/62; H01M 10/0525; H01M 10/058; H01M 10/0585; C01B 25/14; C01B 17/22; C01P 2002/52; C01P 2002/72; C01P 2006/40; Y02E 60/10; Y02P 70/50; H01B 1/06
See application file for complete search history.

(56) References Cited

U.S. PATENT DOCUMENTS

| | | | | |
|---|---|---|---|---|
| 12,129,171 | B2* | 10/2024 | Schneider | H01M 4/62 |
| 2014/0272602 | A1* | 9/2014 | Handa | H01M 10/0525 |
| | | | | 423/303 |
| 2017/0187066 | A1* | 6/2017 | Tsujimura | H01M 10/052 |
| 2018/0069262 | A1* | 3/2018 | Utsuno | H01M 10/0562 |
| 2019/0319240 | A1* | 10/2019 | Chen | H01M 50/494 |
| 2023/0041325 | A1* | 2/2023 | Wang | H01M 10/0562 |

FOREIGN PATENT DOCUMENTS

| | | |
|---|---|---|
| CN | 103560267 A | 2/2014 |
| CN | 104064774 A | 9/2014 |
| CN | 106684432 A | 5/2017 |
| CN | 106887638 A | 6/2017 |
| CN | 108604705 A | 9/2018 |
| CN | 108630983 A | 10/2018 |
| CN | 109193026 A | 1/2019 |
| CN | 109417194 A | 3/2019 |
| CN | 109473715 A | 3/2019 |
| CN | 109638347 A | 4/2019 |
| CN | 111092262 A | 5/2020 |
| JP | 2012104279 A | 5/2012 |

OTHER PUBLICATIONS

International Search Report and Written Opinion for International Patent Application No. PCT/CN2020/094270, mailed Jul. 29, 2020.
Rayavarapu, P.R. et al. "Variation in Structure and Li+-ion Migration in Argyrodite-type Li6PS5X (X=Cl, Br, I) Solid Electrolytes," Journal of Solid State Electrochemistry, vol. 16, No. 5, Oct. 28, 2011 (Oct. 28, 2011), ISSN: 1438-8488, pp. 1808-1809.
Office Action for Chinese Patent Application No. 201911384024.0, dated Oct. 10, 2020.
"First-Principles Characterization of the Unknown Crystal Structure and Ionic Conductivity of Li7P2S81 as a Solid Electrolyte for High-Voltage Li Ion Batteries," The Journal of Physical Chemistry Letters, Published Jun. 27, 2016.
Extended European Search Report for European Application No. 20907182.8, dated May 28, 2024.

* cited by examiner

*Primary Examiner* — Muhammad S Siddiquee
(74) *Attorney, Agent, or Firm* — Andrus Intellectual Property Law, LLP

(57) ABSTRACT

A doped phosphorus-sulfur iodide solid electrolyte, a preparation method therefor, and use thereof. The chemical formula of said solid electrolyte is $Li_{6-x}M_xP_{1-x}S_5I$, in which $0<x<0.8$, and M is tungsten and/or molybdenum. Said method comprises: 1) mixing a lithium source, a phosphorus source, an iodine source, a sulfur source, and an M source in an inert atmosphere, and then ball-milling same to obtain a solid electrolyte precursor; and 2) sintering the solid electrolyte precursor obtained in step 1) in an inert atmosphere or in vacuum to obtain the doped phosphorus-sulfur iodide solid electrolyte.

15 Claims, 3 Drawing Sheets

DOPED PHOSPHORUS-SULFUR IODIDE SOLID ELECTROLYTE, PREPARATION METHOD THEREFOR, AND USE THEREOF

CROSS-REFERENCE TO RELATED APPLICATIONS

This is a national stage application filed under 37 U.S.C. 371 based on International Patent Application No. PCT/CN2020/094270, filed Jun. 4, 2020, which claims priority to Chinese Patent Application No. 201911384024.0, filed on Dec. 28, 2019, the disclosures of which are incorporated herein by reference in their entireties.

TECHNICAL FIELD

The present application relates to the technical field of solid electrolytes, for example, to a doped phosphorus-sulfur iodide solid electrolyte, a preparation method and use thereof.

BACKGROUND

Lithium-ion batteries are green and clean energy storage devices; their current main market involves mobile phones, digital cameras, laptops and other fields, and their main direction in the future is the new energy vehicle industry such as hybrid vehicles and pure electric vehicles; with the rapid development of science and technology, especially the rapid growth of the new energy vehicle industry in recent years, the various requirements for lithium-ion batteries are increasing, which requires the lithium-ion batteries to have long service life and high power density characteristics in addition to high safety performance and high energy density. However, the traditional organic electrolyte used in the battery may overheat due to battery overcharge, short circuit and other problems during use, resulting in a fire or explosion, which poses a safety hazard; therefore, solid electrolytes, whose electrical conductivity is comparable to that of organic electrolytes, and which have high energy density and high safety performance, have gradually attracted attention and have been widely studied.

Compared with traditional organic electrolytes, solid electrolytes have extremely high thermal stability, and there will be no fire and explosion caused by the use of flammable electrolytes in lithium-ion batteries; when the organic electrolytes are used in batteries, there is still an unsolved problem that the metal lithium generates lithium dendrites during the battery utilization as a negative electrode, which leads to the short circuit of the battery and deteriorate the battery cycle performance, while the good mechanical property of solid electrolytes inhibits the growth of part of lithium dendrites, and thus there are less limitation on the application of the lithium negative electrode, and thereby it is believed that solid electrolytes have more promising future. The solid electrolytes are mainly divided into two categories: inorganic solid electrolytes and polymer solid electrolytes, in which the inorganic solid electrolytes have become a research hotspot in recent years due to their higher room temperature ionic conductivity; the inorganic solid electrolytes are divided into oxide solid electrolytes and sulfide solid electrolytes; among them, the sulfide electrolytes have become a research hotspot due to their relatively higher ionic conductivity and softer mechanical properties. At present, the mature sulfide solid electrolytes mainly include glass phase $Li_2S$—$P_2S_5$ and crystal phase $Li_{10\pm1}MP_2X_{12}$ (M=Ge, Si, Sn, Al or P; X=O, S or Se), microcrystalline phase $Li_{11}P_3S_7$, etc., the room temperature ionic conductivity of which can reach $10^{-3}$-$10^{-2}$ S/cm.

In recent years, argyrodite-type sulfide electrolytes, whose room temperature conductivity also can reach $10^{-3}$ S/cm, have been paid more and more attention, which originates from $Ag_8GeS_6$ materials with high $Ag^+$ and $Cu^+$ conductivity, which means the structure also possesses transport channels suitable for fast $Li^+$ transport. The argyrodite-type sulfide electrolytes have a class of $Li_6PS_5X$ (X=Cl, Br and I) electrolytes with a room temperature conductivity of $7\times10^{-3}$ S/cm. The crystal structure of the electrolytes is face-centered cubic packing formed by halogen ion $X^-$ (X=Cl, Br and I), while $PS_4^{3-}$ polyhedron and $S^{2-}$ ion occupy part of octahedral voids and tetrahedral voids, respectively, and there are cage-like polyhedrons around free $S^{2-}$, and it is through this cage-like structure that lithium ions are transported. In this structure, different degrees of positional disorder between $X^-$ (X=Cl, Br and I) and $S^{2-}$ will highly affect the ionic conductivity. In the structure, there is almost no positional disorder between $I^-$, which has larger ionic radius, and $S^{2-}$. So compared with the ionic conductivity of $Li_6PS_5Cl$ and $Li_6PS_5Br$ which has reached $10^{-3}$ S/cm, the conductivity of $Li_6PS_5I$, which is only $10^{-8}$-$10^{-7}$ level, cannot satisfy the requirements of lithium ion transport.

Therefore, it has been an urgent problem to be solved about how to improve the ionic conductivity of $Li_6PS_5I$ for facilitating to the transport of lithium ions.

SUMMARY

The following is a summary of the subject specifically described in the present disclosure. This summary is not intended to limit the protection scope of the claims.

The present application provides a doped phosphorus-sulfur iodide solid electrolyte, a preparation method and use thereof. The doped phosphorus-sulfur iodide solid electrolyte utilizes the large ionic radius of M element to expand the lithium ion transport channel in the structure to improve the ionic conductivity of $Li_6PS_5I$. Raw materials used in the preparation method are convenient and easy to obtain, the solid electrolyte $Li_{6-x}M_xP_{1-x}S_5I$ is prepared through preparation processes such as high-energy ball-milling and powder sintering, and the doped electrolyte exhibits high energy density and stable cycle performance when used in solid-state batteries.

To achieve the object, the present application uses the technical solutions described below.

In a first aspect, the present application provides a doped phosphorus-sulfur iodide solid electrolyte, a general chemical formula of the solid electrolyte is $Li_{6-x}M_xP_{1-x}S_5I$, in which 0<x<0.8, and M is tungsten and/or molybdenum.

In the present application, x may be 0.01, 0.03, 0.05, 0.1, 0.15, 0.2, 0.25, 0.3, 0.4, 0.5, 0.6, 0.7, 0.75, 0.79 or the like.

For the doped phosphorus-sulfur iodide solid electrolyte provided in the present application, W and/or Mo elements with larger ionic radius are doped into $Li_6PS_5I$, which can expand the ion transport channel, namely, facilitate to lithium ions transporting between cages; and the lithium ion vacancies generated after doping W and/or Mo elements increase the quantity of transport channels between cages, which is conductive to the transport of lithium ions. The doped phosphorus-sulfur iodide solid electrolyte has an ionic conductivity of more than or equal to $1.0\times10^{-3}$ S/cm and a wide electrochemical stability window, satisfying the transport requirement of lithium ions.

Optionally, $0.05 \leq x \leq 0.3$, for example, x may be 0.05, 0.08, 0.1, 0.15, 0.2, 0.25, 0.28, 0.3 or the like; the appropriate doping amount can expand the lithium ion transport channel and generate lithium vacancies, thereby improving the conductivity; however, excessive doping can lead to structural collapsing and carrier concentration decreasing, which in turn reduces the ionic conductivity.

Optionally, and the M atom is doped at a position of the phosphorus atom, and the structure has abundant ion transport channels, which is conducive to the transport of lithium ions.

In a second aspect, the present application provides a preparation method of the solid electrolyte according to the first aspect, and the method includes the following steps:

(1) in an inert atmosphere, mixing a lithium source, a phosphorus source, an iodine source, a sulfur source and an M source, and then ball-milling the same, so as to obtain a solid electrolyte precursor; and (2) sintering the solid electrolyte precursor obtained in step (1) in an inert atmosphere or in vacuum, so as to obtain the doped phosphorus-sulfur iodide solid electrolyte.

In the preparation method of the doped phosphorus-sulfur iodide solid electrolyte provided in the present application, by adding the M source, and through ball-milling and sintering process, the M element doped phosphorus-sulfur iodide solid electrolyte is obtained; the large ionic radius of the M element expands the lithium ion transport channel in the structure to improve the ionic conductivity of $Li_6PS_5I$, overcoming the problem of low ionic conductivity of $Li_6PS_5I$. The method has simple and easy-to-obtain raw materials, simple synthesis process, good crystal structure of the synthesized electrolyte, and high application value.

Optionally, a gas of the inert atmosphere in step (1) includes any one or a combination of at least two of argon, nitrogen or helium, in which the typical but non-limiting combination includes: nitrogen and argon, nitrogen and helium, etc.

Optionally, the lithium source in step (1) includes any one or a combination of at least two of lithium sulfide, lithium phosphide or lithium iodide, in which the typical but non-limiting combination includes: lithium sulfide and lithium phosphide, lithium sulfide and lithium iodide, etc.

Optionally, the phosphorus source in step (1) includes any one or a combination of at least two of phosphorus pentasulfide, lithium phosphide or red phosphorus, in which the typical but non-limiting combination includes: phosphorus pentasulfide and lithium phosphide, lithium phosphide and red phosphorus, etc.

Optionally, the iodine source in step (1) includes lithium iodide and/or an iodine element.

Optionally, the sulfur source in step (1) includes any one or a combination of at least two of a sulfur powder, phosphorus pentasulfide or lithium sulfide, in which the typical but non-limiting combination includes: the sulfur powder and phosphorus pentasulfide, the sulfur powder and lithium sulfide, etc.

Optionally, the M source in step (1) includes any one or a combination of at least two of a tungsten powder, a molybdenum powder, tungsten disulfide or molybdenum disulfide, in which a typical but non-limiting combination includes: the tungsten powder and tungsten disulfide, molybdenum disulfide and the molybdenum powder, etc.

Optionally, in terms of element content, lithium, phosphorus, iodine, M and sulfur in the lithium source, the phosphorus source, the iodine source, the M source and the sulfur source in step (1) have a molar ratio of (5.2-6):(0.2-1):1:(0-0.8):5, such as 5.2:0.2:1:0.8:5, 5.3:0.3:1:0.7:5, 5.4: 0.4:1:0.6:5, 5.5:0.5:1:0.5:5, 5.6:0.6:1:0.4:5, 5.7:0.7:1:0.3:5, 5.8:0.8:1:0.2:5 or 5.95:0.95:1:0.05:5, and optionally (5.7-5.95):(0.7-0.95):1:(0.05-0.3):5

Optionally, a ball-to-material ratio of the ball-milling in step (1) is (10-30):1, such as 10:1, 12:1, 15:1, 20:1, 25:1, 28:1 or 30:1, and optionally (15-25):1; if the ball-to-material ratio is less than 10:1, the grinding is insufficient; if the ball-to-material ratio is greater than 30:1, the production efficiency is low.

Optionally, a rotation speed of the ball-milling in step (1) is 100-800 rpm, such as 100 rpm, 120 rpm, 150 rpm, 200 rpm, 300 rpm, 400 rpm, 500 rpm, 600 rpm, 700 rpm, 750 rpm or 800 rpm, and optionally 200-600 rpm; if the rotation speed is less than 100 rpm, the grinding is uneven; if the rotation speed is greater than 800 rpm, the energy consumption is too high.

Optionally, a time of the ball-milling in step (1) is 13-48 h, such as 13 h, 15 h, 18 h, 20 h, 24 h, 30 h, 36 h, 42 h, 45 h or 48 h, and optionally 20-36 h.

Optionally, a gas of the inert atmosphere in step (2) includes any one or a combination of at least two of argon, nitrogen or helium, in which the typical but non-limiting combination includes: nitrogen and argon, nitrogen and helium, etc.

Optionally, a heating rate of the sintering in step (2) is 0.5-10° C./min, such as 0.5° C./min, 1° C./min, 2° C./min, 5° C./min, 7° C./min, 9° C./min or 10° C./min, and optionally 1-5° C./min; if the heating rate is less than 0.5° C./min, the production efficiency is low; if the heating rate is greater than 10° C./min, the reaction is insufficient.

Optionally, a temperature of the sintering in step (2) is 200-700° C., such as 200° C., 250° C., 300° C., 350° C., 400° C., 500° C., 550° C., 600° C., 650° C. or 700° C., and optionally 300-550° C.; if the temperature is lower than 200° C., the target phase cannot be synthesized; if the temperature is higher than 700° C., the target phase also cannot be synthesized.

Optionally, a time of the sintering in step (2) is 2-24 h, such as 2 h, 3 h, 5 h, 10 h, 12 h, 15 h, 20 h, 22 h or 24 h, and optionally 3-18 h.

Optionally, step (2) further includes: performing natural cooling after the sintering, and then grinding.

As an optional technical solution of the present application, the method includes the following steps:

(1) in an inert atmosphere, according to a molar ratio of (5.7-5.95):(0.7-0.95):1:(0.05-0.3):5 of lithium, phosphorus, iodine, M and sulfur elements, mixing the lithium source, the phosphorus source, the iodine source, the sulfur source and the M source, and then with a ball-to-material ratio controlled at (10-30):1, ball-milling the same at a rotation speed of 200-600 rpm for 13-48 h, in which every 30-40 min during the ball-milling, the ball mill is stopped for 3-10 min for cooling, so as to obtain a solid electrolyte precursor; and (2) subjecting the solid electrolyte precursor obtained in step (1) to an inert atmosphere or vacuum, heating the precursor to 200-700° C. at a rate of 0.5-10° C./min, sintering the precursor for 2-24 h, then naturally cooling the product to 18-30° C., and grinding the product into a powder, so as to obtain the doped lithium phosphorus-sulfur iodide solid electrolyte.

In a third aspect, the present application provides an all-solid-state battery, and the all-solid-state battery includes the doped lithium phosphorus-sulfur iodide solid electrolyte according to the first aspect.

For the all-solid-state battery provided in the present application, by using a W and/or Mo element doped phosphorus-sulfur iodide solid electrolyte, the solid electrolyte has a high lithium ion transport rate, resulting in that the all-solid-state battery has high energy density and stable cycle performance.

In a fourth aspect, the present application provides a preparation method of the all-solid-state battery according to the third aspect, and the method includes the following steps:

(a) mixing a positive electrode active material, the doped lithium phosphorus-sulfur iodide solid electrolyte and a conductive agent, and ball-milling the same in an inert atmosphere, so as to obtain a composite positive electrode powder;

(b) subjecting the composite positive electrode powder obtained in step (a) to a first tableting, then adding the doped lithium phosphorus-sulfur iodide solid electrolyte, and performing a second tableting, so as to obtain a composite positive electrode/electrolyte sheet, and attaching a lithium sheet on the sheet, and assembling the same, so as to obtain the all-solid-state battery.

In the preparation method of the all-solid-state battery provided in the present application, by adding the doped lithium phosphorus-sulfur iodide solid electrolyte to the positive electrode, the lithium ion conductivity of the positive electrode can be improved; additionally, by using the doped lithium phosphorus-sulfur iodide solid electrolyte, the lithium ion transport rate can be improved.

The composite positive electrode/electrolyte sheet in the present application refers to the composite positive electrode/electrolyte sheet, which is prepared by subjecting the composite positive electrode powder to a first tableting in a mold, subsequently adding the doped lithium phosphorus-sulfur iodide solid electrolyte, and performing a second tableting, so that the positive electrode sheet, which is formed by compressing the composite positive electrode powder, is in direct contact with the electrolyte sheet formed by compressing the doped lithium phosphorus-sulfur iodide solid electrolyte.

Optionally, the positive electrode active material in step (a) includes any one or a combination of at least two of sulfur, lithium iron phosphate, lithium cobaltate or lithium nickel manganese cobalt oxide, in which the typical but non-limiting combination includes: lithium iron phosphate and lithium nickel manganese cobalt oxide, lithium cobaltate and lithium nickel manganese cobalt oxide, etc.

Optionally, the conductive agent in step (a) includes any one or a combination of at least two of a conductive carbon black, a graphite powder or a Cabot carbon black, in which the typical but non-limiting combination includes: the conductive carbon black and the graphite powder, the conductive carbon black and the Cabot carbon black, the graphite powder and the Cabot carbon black, etc.

Optionally, a part by weight of the positive electrode active material in step (a) is 10-80 parts, a part by weight of the doped lithium phosphorus-sulfur iodide solid electrolyte is 5-50 parts and a part by weight of the conductive agent is 5-80 parts, such as 10 parts, 12 parts, 15 parts, 20 parts, 30 parts, 40 parts, 50 parts, 60 parts, 65 parts, 70 parts, 75 parts or 80 parts.

The part by weight of the doped lithium phosphorus-sulfur iodide solid electrolyte may be 5 parts, 10 parts, 15 parts, 20 parts, 30 parts, 40 parts, 45 parts or 50 parts; the part by weight of the conductive agent may be 5 parts, 10 parts 15 parts, 20 parts, 30 parts, 40 parts, 50 parts, 60 parts, 65 parts, 70 parts, 75 parts or 80 parts.

Optionally, a gas of the inert atmosphere in step (a) includes any one or a combination of at least two of argon, nitrogen or helium, in which the typical but non-limiting combination includes: nitrogen and argon, nitrogen and helium, etc.

Optionally, a rotation speed of the ball-milling in step (a) is 10-350 rpm, such as 10 rpm, 15 rpm, 20 rpm, 30 rpm, 50 rpm, 80 rpm, 100 rpm, 150 rpm, 200 rpm, 300 rpm, 320 rpm or 350 rpm, and optionally 100-300 rpm.

Optionally, a time of the ball-milling in step (a) is 1-10 h, such as 1 h, 3 h, 5 h, 7 h, 9 h or 10 h, and optionally 3-8 h.

Optionally, pressures of the first tableting and the second tableting in step (b) are independently 20-300 MPa, such as 20 Mpa, 25 Mpa, 30 Mpa, 50 Mpa, 100 Mpa, 120 Mpa, 150 Mpa, 200 Mpa, 250 Mpa, 280 Mpa or 300 Mpa, and optionally 50-200 MPa Optionally, the composite positive electrode powder and the doped lithium phosphorus-sulfur iodide solid electrolyte in step (b) have a mass ratio of (3-100):1, such as 3:1, 5:1, 10:1, 20:1, 50:1, 70:1, 80:1, 90:1 or 100:1, and optionally (5-20):1.

Exemplarily, the present application provides a preparation method of an all-solid-state battery, including the following steps:

(a) mixing 10-80 parts by weight of a positive electrode active material, 5-50 parts by weight of a doped solid electrolyte and 5-80 parts by weight of a conductive carbon black, and ball-milling the same in an inert atmosphere, in which a ball-milling time is 1-10 h, a ball-milling rotation speed is 10-350 rpm, so as to obtain a composite positive electrode powder;

(b) with a 14 mm mold taken as a tableting tool, firstly, laying an aluminum foil on the bottom of the mold, then adding 2-16 mg of the composite positive electrode powder obtained in step (a) and compressing the powder with a pressure of 20-300 MPa into a sheet, and then adding 50-200 mg of a solid electrolyte powder and compressing the same with a pressure of 20-300 MPa into a composite positive electrode/electrolyte sheet; and (c) attaching a lithium sheet with a diameter of 9 mm on the composite positive electrode/electrolyte sheet obtained in step (b) as a negative electrode, putting the obtained module into a 2025 battery case for assembling, so as to obtain the all-solid-state battery.

Compared with the prior art, the present application has at least the following beneficial effects:

(1) The doped phosphorus-sulfur iodide solid electrolyte provided in the present application expands the ion transport channel by doping W and/or Mo elements with larger ionic radius, and the lithium ion vacancies generated after doping increase the quantity of transport channels between cages, facilitating to the transport of lithium ions; the doped phosphorus-sulfur iodide solid electrolyte has an ionic conductivity of more than or equal to $1.0 \times 10^{-3}$ S/cm and a wide electrochemical stability window;

(2) The preparation method of the doped phosphorus-sulfur iodide solid electrolyte provided in the present application, by adding M source and performing ball-milling and sintering process, gives the M element-doped phosphorus-sulfur iodide solid electrolyte, and improves the ionic conductivity of $Li_6PS_5I$; the method has simple and easy-to-obtain raw materials, simple synthesis process, good crystal structure of the synthesized electrolyte, and high application value; and (3) An all-solid-state battery provided in the present application has high energy density and stable cycle performance by using the doped phosphorous-sulfur-iodine solid electrolyte; furthermore, the lithium ion conductivity of the positive electrode can be improved by adding the doped phosphorous-sulfur-iodine solid electrolyte to the positive electrode.

Other aspects will become apparent upon reading and understanding the detailed description and drawings.

DETAILED DESCRIPTION

Figure 1:
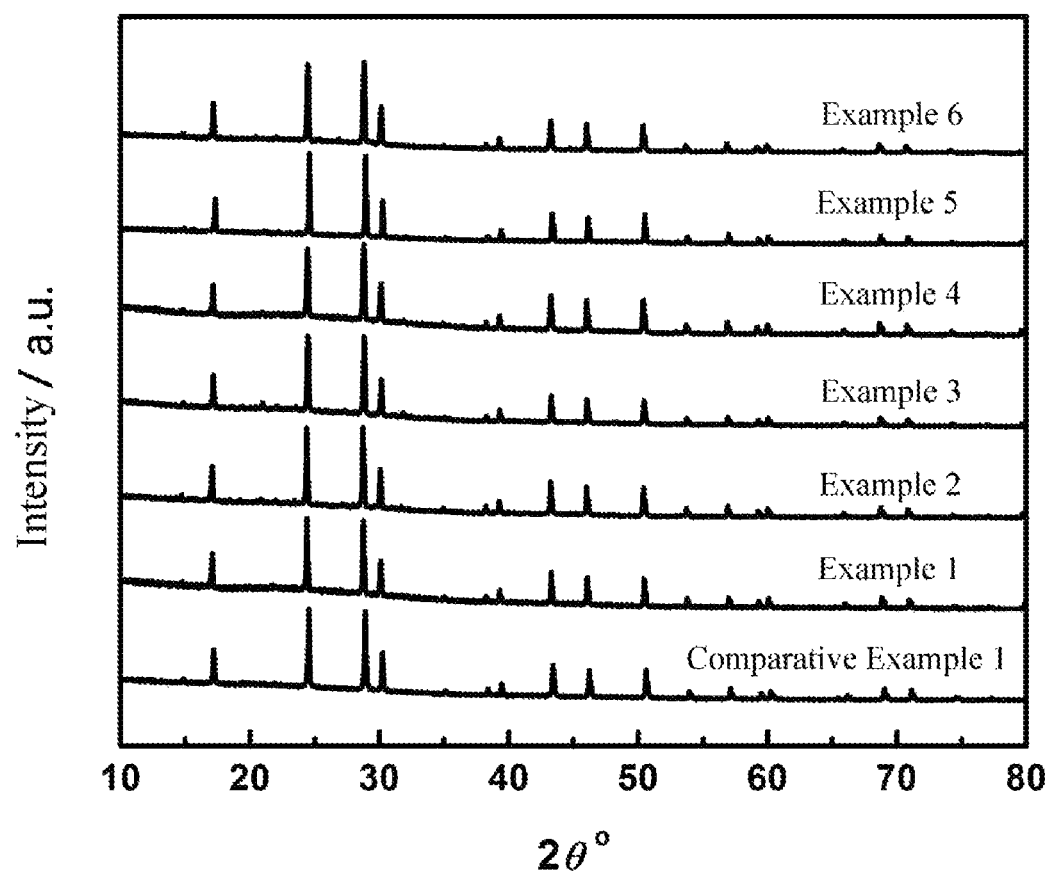
FIG. 1 shows XRD patterns of solid electrolytes prepared in Examples 1-6 and Comparative Example 1.

Technical solutions used in the present application for achieving the predetermined technical effect are further illustrated below in conjunction with accompanying drawings and specific embodiments, and the specific embodiments of the present application are described in detail below.

Example 1

This example provides a preparation method of a doped phosphorus-sulfur iodide solid electrolyte, including the following steps:

(1) 0.478 g, 0.500 g, 0.670 g, 0.092 g and 0.048 g of lithium sulfide, phosphorus pentasulfide, lithium iodide, a tungsten powder and a sulfur powder were weighted out respectively according to a molar ratio of 2.45:0.45:1:0.1:0.3, and ball-milled in a ball-milling jar under argon atmosphere protection, in which 20 zirconia balls with a diameter of 12 mm were used, a ball-milling rotation speed was 350 rpm, a ball-milling time was 18 h, and the ball mill was cooled every 30 min for 10 min during the operation, so as to obtain a solid electrolyte precursor; and (2) Under the argon atmosphere, the solid electrolyte precursor was transferred from the ball-milling jar to a quartz tube, and then put into a tube furnace for sintering, in which a heating rate was 2° C./min, and a sintering temperature was 550° C.; after the temperature was kept for 5 h, the product was naturally cooled and then ground into a powder, so as to obtain the tungsten-doped phosphorus-sulfur iodide solid electrolyte.

The tungsten-doped phosphorus-sulfur iodide solid electrolyte prepared in this example has a chemical formula of $Li_{5.9}W_{0.1}P_{0.9}S_5I$.

Example 2

This example provides a preparation method of a doped phosphorus-sulfur iodide solid electrolyte, including the following steps:

(1) 0.468 g, 50.444 g, 0.670 g, 0.184 g and 0.096 g of lithium sulfide, phosphorus pentasulfide, lithium iodide, a tungsten powder and a sulfur powder were weighted out respectively according to a molar ratio of 2.4:0.4:1:0.2:0.6, and ball-milled in a ball-milling jar under argon atmosphere protection, in which 20 zirconia balls with a diameter of 12 mm were used, a ball-milling rotation speed was 400 rpm, a ball-milling time was 15 h, and the ball mill was cooled every 35 min for 6 min during the operation, so as to obtain a solid electrolyte precursor; and (2) Under the argon atmosphere, the solid electrolyte precursor was transferred from the ball-milling jar to a quartz tube, and then put into a tube furnace for sintering, in which a heating rate was 1° C./min, and a sintering temperature was 550° C.; after the temperature was kept for 5 h, the product was naturally cooled and then ground into a powder, so as to obtain the tungsten-doped phosphorus-sulfur iodide solid electrolyte.

The tungsten-doped phosphorus-sulfur iodide solid electrolyte prepared in this example has a chemical formula of $Li_{5.8}W_{0.2}P_{0.8}S_5I$.

Example 3

This example provides a preparation method of a doped phosphorus-sulfur iodide solid electrolyte, including the following steps:

(1) 0.458 g, 50.3885 g, 0.670 g, 20.372 g and 0.048 g of lithium sulfide, phosphorus pentasulfide, lithium iodide, tungsten disulfide and a sulfur powder were weighted out respectively according to a molar ratio of 2.35:0.35:1:0.3:0.9, and ball-milled in a ball-milling jar under argon atmosphere protection, in which 18 zirconia balls with a diameter of 12 mm were used, a ball-milling rotation speed was 350 rpm, a ball-milling time was 18 h, and the ball mill was cooled every 30 min for 10 min during the operation, so as to obtain a solid electrolyte precursor; and (2) Under the argon atmosphere, the solid electrolyte precursor was transferred from the ball-milling jar to a quartz tube, and then put into a tube furnace for sintering, in which a heating rate was 2° C./min, and a sintering temperature was 550° C.; after the temperature was kept for 2 h, the product was naturally cooled and then ground into a powder, so as to obtain the tungsten-doped phosphorus-sulfur iodide solid electrolyte.

The tungsten-doped phosphorus-sulfur iodide solid electrolyte prepared in this example has a chemical formula of $Li_{5.7}W_{0.3}P_{0.7}S_5I$.

Example 4

This example provides a preparation method of a doped phosphorus-sulfur iodide solid electrolyte, including the following steps:

(1) 0.478 g, 50.500 g, 0.670 g, 0.048 g and 0.048 g of lithium sulfide, phosphorus pentasulfide, lithium iodide, a molybdenum powder and a sulfur powder were weighted out respectively according to a molar ratio of 2.45:0.45:1:0.1:0.3, and ball-milled in a ball-milling jar under argon atmosphere protection, in which 20 zirconia balls with a diameter of 12 mm were used, a ball-milling rotation speed was 350 rpm, a ball-milling time was 18 h, and the ball mill was cooled every 30 min for 10 min during the operation, so as to obtain a solid electrolyte precursor; and (2) Under the argon atmosphere, the solid electrolyte precursor was transferred from the ball-milling jar to a quartz tube, and then put into a tube furnace for sintering, in which a heating rate was 2° C./min, and a sintering temperature was 550° C.; after the temperature was kept for 5 h, the product was naturally cooled and then ground into a powder, so as to obtain the molybdenum-doped phosphorus-sulfur iodide solid electrolyte.

The molybdenum-doped phosphorus-sulfur iodide solid electrolyte prepared in this example has a chemical formula of $Li_{5.9}Mo_{0.1}P_{0.9}S_5I$.

Example 5

This example provides a preparation method of a doped phosphorus-sulfur iodide solid electrolyte, including the following steps:

(1) 0.468 g, 50.444 g, 0.670 g, 0.096 g and 0.096 g of lithium sulfide, phosphorus pentasulfide, lithium iodide, a molybdenum powder and a sulfur powder were weighted out respectively according to a molar ratio of 2.4:0.4:1:0.2:0.6, and ball-milled in a ball-milling jar under argon atmosphere protection, in which 20 zirconia balls with a diameter of 12 mm were used, a ball-milling rotation speed was 400 rpm, a ball-milling time was 15 h, and the ball mill was cooled every 35 min for 6 min during the operation, so as to obtain a solid electrolyte precursor; and (2) Under the argon atmosphere, the solid electrolyte precursor was transferred from the ball-milling jar to a quartz tube, and then put into a tube furnace for sintering, in which a heating rate was 1° C./min, and a sintering temperature was 550° C.; after the temperature was kept for 5 h, the product was naturally cooled and then ground into a powder, so as to obtain the molybdenum-doped phosphorus-sulfur iodide solid electrolyte.

The molybdenum-doped phosphorus-sulfur iodide solid electrolyte prepared in this example has a chemical formula of $Li_{5.8}Mo_{0.2}P_{0.8}S_5I$.

Example 6

This example provides a preparation method of a doped phosphorus-sulfur iodide solid electrolyte, including the following steps:

(1) 0.458 g, 50.389 g, 0.67 g, 20.24 g and 0.048 g of lithium sulfide, phosphorus pentasulfide, lithium iodide, molybdenum disulfide and a sulfur powder were weighted out respectively according to a molar ratio of 2.35:0.35:1:0.3:0.3, and ball-milled in a ball-milling jar under argon atmosphere protection, in which 18 zirconia balls with a diameter of 12 mm were used, a ball-milling rotation speed was 500 rpm, a ball-milling time was 24 h, and the ball mill was cooled every 35 min for 6 min during the operation, so as to obtain a solid electrolyte precursor; and (2) Under the argon atmosphere, the solid electrolyte precursor was transferred from the ball-milling jar to a quartz tube, and then put into a tube furnace for sintering, in which a heating rate was 2° C./min, and a sintering temperature was 550° C.; after the temperature was kept for 2 h, the product was naturally cooled and then ground into a powder, so as to obtain the molybdenum-doped phosphorus-sulfur iodide solid electrolyte.

The molybdenum-doped phosphorus-sulfur iodide solid electrolyte prepared in this example has a chemical formula of $Li_{5.7}Mo_{0.3}P_{0.7}S_5I$.

Example 7

This example provides a preparation method of a doped phosphorus-sulfur iodide solid electrolyte, including the following steps:

(1) 0.644 g, 0.312 g, 1.34 g, 0.288 g, 0.184 g and 1.152 g of lithium sulfide, lithium phosphide, lithium iodide, a molybdenum powder, a tungsten powder and a sulfur powder were weighted out respectively according to a molar ratio of 1.4:0.6:1:0.3:0.1:3.6, and ball-milled in a ball-milling jar under nitrogen atmosphere protection, in which 20 zirconia balls with a diameter of 12 mm were used, a ball-milling rotation speed was 200 rpm, a ball-milling time was 13 h, and the ball mill was cooled every 30 min for 3 min during the operation, so as to obtain a solid electrolyte precursor; and (2) Under the nitrogen atmosphere, the solid electrolyte precursor was transferred from the ball-milling jar to a quartz tube, and then put into a tube furnace for sintering, in which a heating rate was 0.5° C./min, and a sintering temperature was 200° C.; after the temperature was kept for 24 h, the product was naturally cooled and then ground into a powder, so as to obtain the molybdenum-tungsten-doped phosphorus-sulfur iodide solid electrolyte.

The molybdenum-tungsten-doped phosphorus-sulfur iodide solid electrolyte prepared in this example has a chemical formula of $Li_{5.6}Mo_{0.3}W_{0.1}P_{0.6}S_5I$.

Example 8

This example provides a preparation method of a doped phosphorus-sulfur iodide solid electrolyte, including the following steps:

(1) 1.208 g, 0.0775 g, 1.27 g, 1.2 g and 0.28 g of lithium sulfide, red phosphorus, an iodine element, molybdenum disulfide and a sulfur powder were weighted out respectively according to a molar ratio of 2.625:0.25:0.5:0.75:0.875, and ball-milled in a ball-milling jar under helium atmosphere protection, in which 25 zirconia balls with a diameter of 12 mm were used, a ball-milling rotation speed was 600 rpm, a ball-milling time was 48 h, and the ball mill was cooled every 40 min for 10 min during the operation, so as to obtain a solid electrolyte precursor; and (2) Under the nitrogen atmosphere, the solid electrolyte precursor was transferred from the ball-milling jar to a quartz tube, and then put into a tube furnace for sintering, in which a heating rate was 10° C./min, and a sintering temperature was 700° C.; after the temperature was kept for 2 h, the product was naturally cooled and then ground into a powder, so as to obtain the molybdenum-doped phosphorus-sulfur iodide solid electrolyte.

The molybdenum-doped phosphorus-sulfur iodide solid electrolyte prepared in this example has a chemical formula of $Li_{5.25}Mo_{0.75}P_{0.25}S_5I$.

Example 9

This example provides a preparation method of a doped phosphorus-sulfur iodide solid electrolyte, including the following steps:

(1) 0.26 g, 1.34 g, 1.24 g, 0.69 g and 0.8 g of lithium phosphide, lithium iodide, tungsten disulfide, lithium sulfide and sulfur were weighted out respectively according to a molar ratio of 0.5:1:0.5:1.5:2.5, and ball-milled in a ball-milling jar under argon atmosphere protection, in which 15 zirconia balls with a diameter of 12 mm were used, a ball-milling rotation speed was 400 rpm, a ball-milling time was 36 h, and the ball mill was cooled every 35 min for 8 min during the operation, so as to obtain a solid electrolyte precursor; and (2) The solid electrolyte precursor was transferred from the ball-milling jar to a quartz tube, and then put into a tube furnace for sintering, in which under vacuum, a heating rate was 5° C./min, and a sintering temperature was 300° C.; after the temperature was kept for 12 h, the product was naturally cooled and then ground into a powder, so as to obtain the tungsten-doped phosphorus-sulfur iodide solid electrolyte.

The tungsten-doped phosphorus-sulfur iodide solid electrolyte prepared in this example has a chemical formula of $Li_{5.5}W_{0.5}P_{0.5}S_5I$.

Comparative Example 1

This comparative example provides a preparation method of a non-doped phosphorus-sulfur iodide solid electrolyte, including the following steps:

(1) 1 g, 0.9678 g and 0.369 g of lithium sulfide, phosphorus pentasulfide and lithium iodide were weighted out respectively according to a molar ratio of 5:1:2, and ball-milled in a ball-milling jar under argon atmosphere protection, in which 18 zirconia balls with a diameter of 12 mm were used, a ball-milling rotation speed was 500 rpm, a ball-milling time was 24 h, and the ball mill was cooled every 35 min for 6 min during the operation, so as to obtain a solid electrolyte precursor; and (2) Under the argon atmosphere, the solid electrolyte precursor was transferred from the ball-milling jar to a quartz tube, and then put into a tube furnace for sintering, in which a heating rate was 2° C./min, and a sintering temperature was 550° C.; after the temperature was kept for 2 h, the product was naturally cooled and then ground into a powder, so as to obtain the non-doped phosphorus-sulfur iodide solid electrolyte.

The non-doped phosphorus-sulfur iodide solid electrolyte prepared in this comparative example has a chemical formula of $Li_6PS_5I$.

Application Example 1

This application example provides an all-solid-state battery, and a solid electrolyte of the battery is the tungsten-doped phosphorus-sulfur iodide solid electrolyte prepared in Example 1, of which the chemical formula is $Li_{5.9}W_{0.1}P_{0.9}S_5I$.

A preparation method of the all-solid-state battery includes the following steps:

(1) 8 g of lithium iron phosphate, 1 g of a conductive carbon black and 1 g of a solid electrolyte were ball-milled for 6 h in a ball-milling jar under argon atmosphere protection, and a ball-milling rotation speed was 180 rpm, so as to obtain a composite positive electrode powder;

(2) With a 14 mm mold taken as a tableting tool, firstly, an aluminum foil was laid on the bottom of the mold, then 8 mg of the composite positive electrode powder obtained in step (1) was added and compressed with a pressure of 200 MPa into a composite positive electrode sheet, and then 100 mg of the tungsten-doped phosphorus-sulfur iodide solid electrolyte was added and compressed with a pressure of 150 MPa into a composite positive electrode/electrolyte sheet; and (3) A lithium sheet with a diameter of 9 mm was attached on the composite positive electrode/electrolyte sheet obtained in step (2) as a negative electrode, and what obtained was put into a 2025 battery case for assembling, so as to obtain the all-solid-state battery.

Application Example 2

This application example provides an all-solid-state battery, and a solid electrolyte of the battery is the tungsten-doped phosphorus-sulfur iodide solid electrolyte prepared in Example 2, of which the chemical formula is $Li_{5.8}W_{0.2}P_{0.8}S_5I$.

A preparation method of the all-solid-state battery includes the following steps:

(1) 5 g of lithium nickel manganese cobalt oxide ($LiNi_{0.8}Mn_{0.1}Co_{0.1}O_2$), 1.5 g of a conductive carbon black and 1.5 g of a solid electrolyte were ball-milled for 1 h in a ball-milling jar under nitrogen atmosphere protection, and a ball-milling rotation speed was 50 rpm, so as to obtain a composite positive electrode powder;

(2) With a 14 mm mold taken as a tableting tool, firstly, an aluminum foil was laid on the bottom of the mold, then 16 mg of the composite positive electrode powder obtained in step (1) was added and compressed with a pressure of 50 MPa into a composite positive electrode sheet, and then 50 mg of the tungsten-doped phosphorus-sulfur iodide solid electrolyte was added and compressed with a pressure of 50 MPa into a composite positive electrode/electrolyte sheet; and (3) A lithium sheet with a diameter of 9 mm was attached on the composite positive electrode/electrolyte sheet obtained in step (2) as a negative electrode, and what obtained was put into a 2025 battery case for assembling, so as to obtain the all-solid-state battery.

Application Example 3

This application example provides an all-solid-state battery, and a solid electrolyte of the battery is the tungsten-doped phosphorus-sulfur iodide solid electrolyte prepared in Example 3, of which the chemical formula is $Li_{5.7}W_{0.3}P_{0.7}S_5I$.

A preparation method of the all-solid-state battery includes the following steps:

(1) 8 g of lithium nickel manganese cobalt oxide ($LiNi_{0.8}Mn_{0.1}Co_{0.1}O_2$), 0.5 g of a conductive carbon black and 5 g of a solid electrolyte were ball-milled for 10 h in a ball-milling jar under helium atmosphere protection, and a ball-milling rotation speed was 350 rpm, so as to obtain a composite positive electrode powder;

(2) With a 14 mm mold taken as a tableting tool, firstly, an aluminum foil was laid on the bottom of the mold, then 2 mg of the composite positive electrode powder obtained in step (1) was added and compressed with a pressure of 300 MPa into a composite positive electrode sheet, and then 200 mg of the tungsten-doped phosphorus-sulfur iodide solid electrolyte was added and compressed with a pressure of 300 MPa into a composite positive electrode/electrolyte sheet; and (3) A lithium sheet with a diameter of 9 mm was attached on the composite positive electrode/electrolyte sheet obtained in step (2) as a negative electrode, and what obtained was put into a 2025 battery case for assembling, so as to obtain the all-solid-state battery.

Application Example 4

This application example provides an all-solid-state battery, and a solid electrolyte of the battery is the molybdenum-doped phosphorus-sulfur iodide solid electrolyte prepared in Example 4, of which the chemical formula is $Li_{5.9}Mo_{0.1}P_{0.9}S_5I$.

A preparation method of the all-solid-state battery includes the following steps:

(1) 4.5 g of lithium nickel manganese cobalt oxide ($LiNi_{0.8}Mn_{0.1}Co_{0.1}O_2$), 2.5 g of a conductive carbon black and 4 g of a solid electrolyte were ball-milled for 5 h in a ball-milling jar under helium atmosphere protection, and a ball-milling rotation speed was 120 rpm, so as to obtain a composite positive electrode powder;

(2) With a 14 mm mold taken as a tableting tool, firstly, an aluminum foil was laid on the bottom of the mold, then 5 mg of the composite positive electrode powder obtained in step (1) was added and compressed with a pressure of 120 MPa into a composite positive electrode sheet, and then 120 mg of the molybdenum-doped phosphorus-sulfur iodide solid electrolyte was added and compressed with a pressure of 150 MPa into a composite positive electrode/electrolyte sheet; and (3) A lithium sheet with a diameter of 9 mm was attached on the composite positive electrode/electrolyte sheet obtained in step (2) as a negative electrode, and what obtained was put into a 2025 battery case for assembling, so as to obtain the all-solid-state battery.

Application Example 5

Compared with Application Example 2, the only difference is that the solid electrolyte in step (2) was replaced with the molybdenum-doped phosphorus-sulfur iodide solid electrolyte prepared in Example 5, of which the chemical formula is $Li_{5.8}Mo_{0.2}P_{0.8}S_5I$.

Application Example 6

Compared with Application Example 2, the only difference is that the solid electrolyte in step (2) was replaced with the molybdenum-doped phosphorus-sulfur iodide solid electrolyte prepared in Example 6, of which the chemical formula is $Li_{5.7}Mo_{0.3}P_{0.7}S_5I$.

Figure 3:
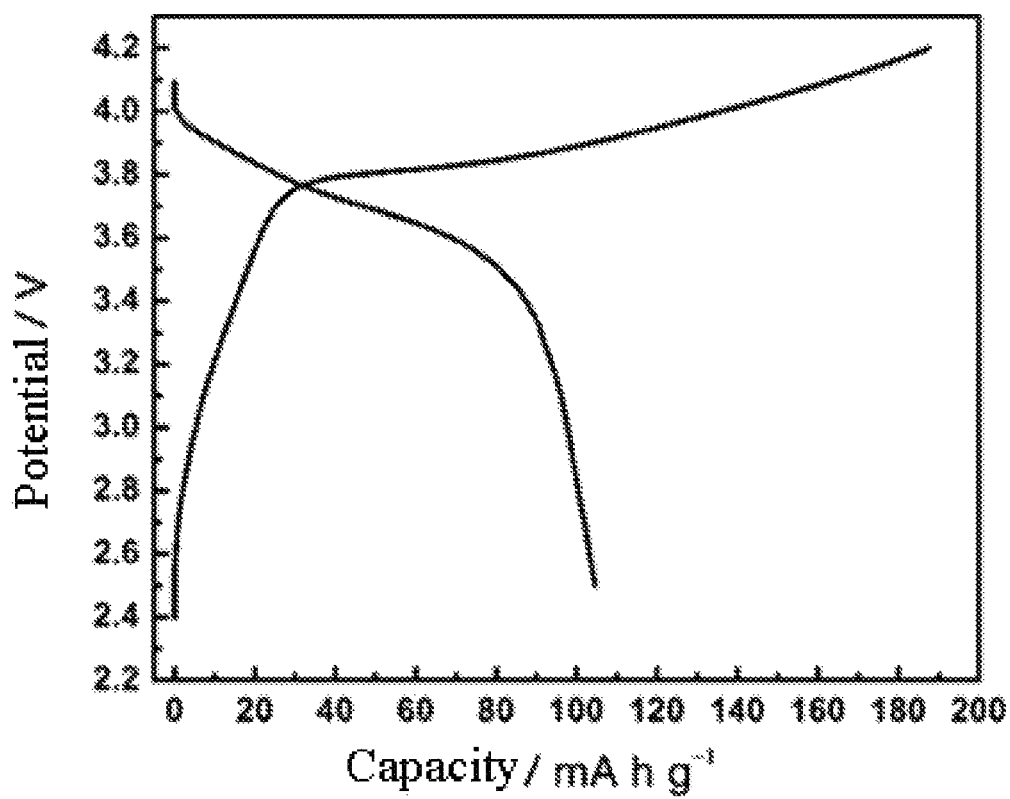
FIG. 3 shows an initial charge-discharge curve of an all-solid-state battery prepared in Application Example 6.

The all-solid-state battery prepared in this application example was tested for capacity at 0.05 C. The test results are shown in FIG. 3, and it can be seen from the figure that the capacity of the all-solid-state battery was 105 mAh/g.

Application Example 7

Compared with Application Example 2, the only difference is that the solid electrolyte in step (2) was replaced with the molybdenum-tungsten-doped phosphorus-sulfur iodide solid electrolyte prepared in Example 7, of which the chemical formula is $Li_{5.6}Mo_{0.3}W_{0.1}P_{0.6}S_5I$.

Application Example 8

Compared with Application Example 2, the only difference is that the solid electrolyte in step (2) was replaced with the molybdenum-doped phosphorus-sulfur iodide solid electrolyte prepared in Example 8, of which the chemical formula is $Li_{5.25}Mo_{0.75}P_{0.25}S_5I$.

Application Example 9

Compared with Application Example 2, the only difference is that the solid electrolyte in step (2) was replaced with the tungsten-doped phosphorus-sulfur iodide solid electrolyte prepared in Example 9, of which the chemical formula is $Li_{5.5}W_{0.5}P_{0.5}S_5I$.

Comparative Application Example 1

Compared with Application Example 6, the only difference is that the solid electrolyte in step (2) was replaced with the non-doped phosphorus-sulfur iodide solid electrolyte prepared in Comparative Example 1, of which the chemical formula is $Li_6PS_5I$.

Evaluation of Phosphorus-Sulfur Iodide Solid Electrolyte Performance:

The phosphorus-sulfur iodide solid electrolytes prepared in the above examples and comparative examples were subjected to XRD test. In the test, the test results of Examples 1-6 and Comparative Example 1 are shown in FIG. 1. It can be seen from the figure that the distribution patterns of diffraction peak position of all samples are the same, which indicates that the synthesized materials all have the same crystal structure.

Evaluation of all-solid-state battery performance:

The all-solid-state batteries prepared in Application Examples 1-9 and Comparative Application Example 1 were tested for ionic conductivity and capacity. The test method for ionic conductivity was that: an incubator was used to heat up and keep warm, the alternating current impedance was measured each time point when the temperature was increased 5° C. and kept for 10 min, so as to obtain a curve graph of the ionic conductivity of the corresponding electrolyte as a function of temperature from 30° C. to 100° C.

Figure 2:
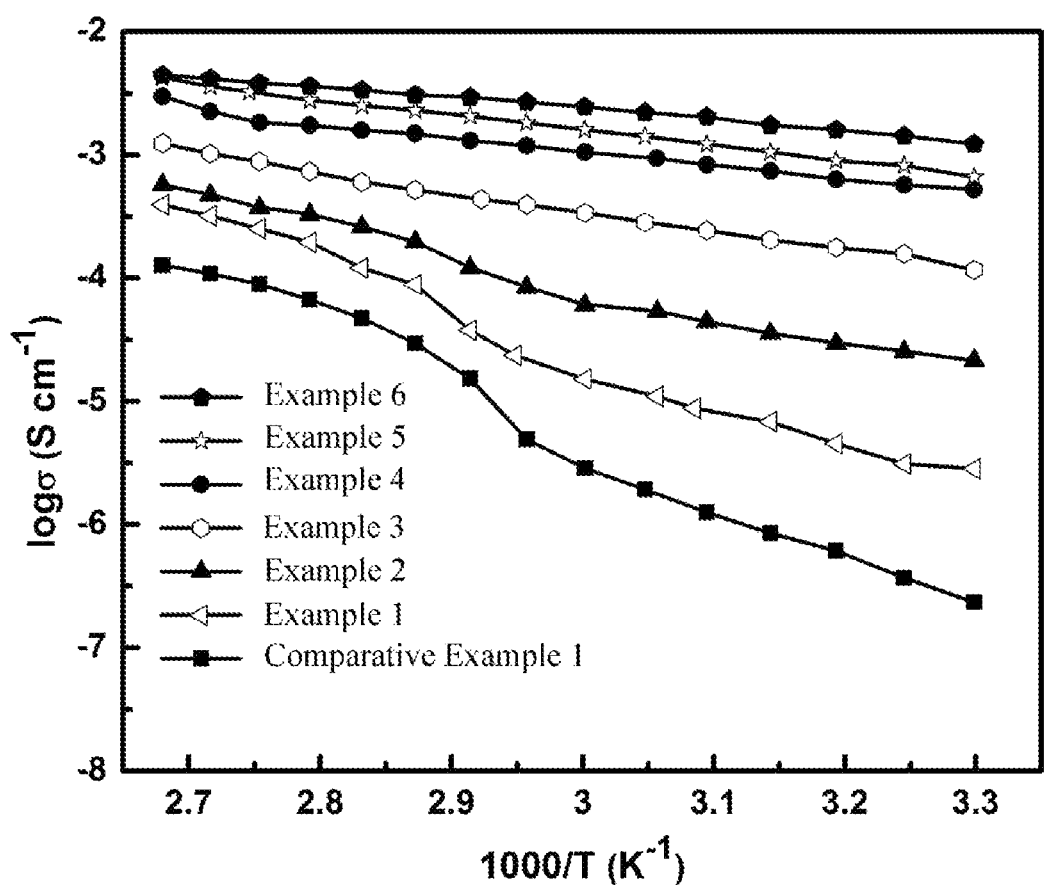
FIG. 2 shows ionic conductivity curves of solid electrolytes prepared in Examples 1-6 and Comparative Example 1 as a function of temperature.

In the test, the curve of the ionic conductivity of solid electrolytes prepared in Examples 1-6 and Comparative Example 1 as a function of temperature is shown in FIG. 2. It can be seen from the figure that the ionic conductivity of the phosphorus-sulfur iodide solid electrolyte could reach more than or equal to $1.0 \times 10^{-3}$ S/cm; with the temperature increased, the ionic conductivity increased; at the same temperature, with the a molar content of doping element increased, the ionic conductivity increased, and the doping effect of Mo element was better than the doping effect of W element.

The test method for capacity was that: at 25° C., the assembled battery was subjected to a constant-current charge-discharge test, and the charge-discharge rate was 0.05 C. The test results are shown in Table 1.

TABLE 1

| | Initial discharge specific capacity (mAh/g) | Discharge specific capacity after 100 cycles (mAh/g) |
|---|---|---|
| Application Example 1 | 10 | 6 |
| Application Example 2 | 15 | 8 |
| Application Example 3 | 60 | 42 |
| Application Example 4 | 65 | 45 |
| Application Example 5 | 96 | 78 |
| Application Example 6 | 105 | 97 |
| Application Example 7 | 90 | 76 |
| Application Example 8 | 32 | 25 |
| Application Example 9 | 28 | 23 |
| Comparative Application Example 1 | 5 | 2 |

It can be seen from Table 1 that:

(1) Combining the application examples 1-9 together, it can be seen that for the all-solid-state batteries assembled in the application examples 1-2 and the application examples 8-9, the initial discharge specific capacity was 10-32 mAh/g, the discharge specific capacity after 100 cycles was 6-25 mAh/g, and the specific capacity was not high, of which the main reason was that the lithium ion conductivity of the solid electrolyte used was low; for the all-solid-state batteries prepared by using the doped phosphorus-sulfur iodide solid electrolyte in application examples 3-7, the initial discharge specific capacity was 60-105 mAh/g, and the discharge specific capacity after 100 cycles was 42-97 mAh/g, which indicates that the all-solid-state batteries prepared in application examples 3-7 have high energy density and stable cycle performance;

(2) Combining Application Example 6 and Comparative Application Example 1 together, it can be seen that for the all-solid-state battery prepared by using the molybdenum-doped phosphorus-sulfur iodide solid electrolyte in Application Example 6, the initial discharge specific capacity was 105 mAh/g, and the discharge specific capacity after 100 cycles was 97 mAh/g; for the all-solid-state battery prepared by using the non-doped phosphorus-sulfur iodide solid electrolyte in Comparative Application Example 1, the initial discharge specific capacity was 5 mAh/g, and the discharge specific capacity after 100 cycles was 2 mAh/g, which indicates that the all-solid-state battery prepared by using molybdenum-doped phosphorus-sulfur iodide solid electrolyte in Application Example 6 has higher energy density and stable cycle performance.

In conclusion, the doped phosphorus-sulfur iodide solid electrolyte provided in the present application can improve the ionic conductivity by doping W and/or Mo elements with larger ionic radius into $Li_6PS_5I$, and the ionic conductivity can reach more than or equal to $1.0\times10^{-3}$ S/cm, and the electrochemical stability window is wide; the preparation method of the doped phosphorus-sulfur iodide solid electrolyte provided in the present application has simple and easy-to-obtain raw materials, simple synthesis process, and good crystal structure of the synthesized electrolyte; the all-solid-state battery provided in the present application has high energy density and stable cycle performance by using the doped phosphorus-sulfur iodide solid electrolyte, and has wide application prospects.

The applicant has stated that although the detailed structural features of the present application are illustrated through the above embodiments in the present application, the present application is not limited to the above detailed structural features, which means that the present application does not necessarily rely on the above detailed structural features to be implemented.

What is claimed is:

1. A doped phosphorus-sulfur iodide solid electrolyte, of which a general chemical formula is Li6-xMxP1-xS5I, wherein 0<x<0.8, and M is tungsten and/or molybdenum.

2. The solid electrolyte according to claim 1, wherein $0.05 \leq x \leq 0.3$.

3. The solid electrolyte according to claim 1, wherein the solid electrolyte has a cubic argyrodite structure, and the M atom is doped at a position of the phosphorus atom.

4. A preparation method of the solid electrolyte according to claim 1, comprising the following steps:
   (1) in an inert atmosphere, mixing a lithium source, a phosphorus source, an iodine source, a sulfur source and an M source, and then ball-milling the same, so as to obtain a solid electrolyte precursor; and
   (2) sintering the solid electrolyte precursor obtained in step (1) in an inert atmosphere or in vacuum, so as to obtain the doped phosphorus-sulfur iodide solid electrolyte.

5. The preparation method according to claim 4, wherein in terms of element content, lithium, phosphorus, iodine, M and sulfur in the lithium source, the phosphorus source, the iodine source, the M source and the sulfur source in step (1) have a molar ratio of (5.2-5.95):(0.2-0.95):1:(0.05-0.8):5, optionally (5.7-5.95):(0.7-0.95):1:(0.05-0.3):5.

6. The preparation method according to claim 4, wherein a ball-to-material ratio of the ball-milling in step (1) is (10-30):1, optionally (15-25):1.

7. The preparation method according to claim 4, wherein a gas of the inert atmosphere in step (1) comprises any one or a combination of at least two of argon, nitrogen or helium;
   optionally, the lithium source in step (1) comprises any one or a combination of at least two of lithium sulfide, lithium phosphide or lithium iodide;
   optionally, the phosphorus source in step (1) comprises any one or a combination of at least two of phosphorus pentasulfide, lithium phosphide or red phosphorus;
   optionally, the iodine source in step (1) comprises lithium iodide and/or an iodine element;
   optionally, the sulfur source in step (1) comprises any one or a combination of at least two of a sulfur powder, phosphorus pentasulfide or lithium sulfide;
   optionally, the M source in step (1) comprises any one or a combination of at least two of a tungsten powder, a molybdenum powder, tungsten disulfide or molybdenum disulfide;
   optionally, a rotation speed of the ball-milling in step (1) is 100-800 rpm, optionally 200-600 rpm;
   optionally, a time of the ball-milling in step (1) is 13-48 h, optionally 20-36 h.

8. The preparation method according to claim 4, wherein a gas of the inert atmosphere in step (2) comprises any one or a combination of at least two of argon, nitrogen or helium;
   optionally, a heating rate of the sintering in step (2) is 0.5-10° C./min, optionally 1-5° C./min;
   optionally, a temperature of the sintering in step (2) is 200-700° C., optionally 300-550° C.;
   optionally, a time of the sintering in step (2) is 2-24 h, optionally 3-18 h;
   optionally, step (2) further comprises: performing natural cooling after the sintering, and then grinding.

9. The preparation method according to claim 4, wherein the method comprises the following steps:
   (1) in an inert atmosphere, according to a molar ratio of (5.7-5.95):(0.7-0.95):1:(0.05-0.3):5 of lithium, phosphorus, iodine, M and sulfur elements, mixing the lithium source, the phosphorus source, the iodine source, the sulfur source and the M source, and then with a ball-to-material ratio controlled at (10-30):1, ball-milling the same at a rotation speed of 200-600 rpm for 13-48 h, wherein every 30-40 min during the ball-milling, the ball mill is stopped for 3-10 min for cooling, so as to obtain a solid electrolyte precursor; and
   (2) subjecting the solid electrolyte precursor obtained in step (1) to an inert atmosphere or vacuum, heating the precursor to 200-700° C. at a rate of 0.5-10° C./min, sintering the precursor for 2-24 h, then naturally cooling the product to 18-30° C., and grinding the product into a powder, so as to obtain the doped lithium phosphorus-sulfur iodide solid electrolyte.

10. An all-solid-state battery, comprising the doped lithium phosphorus-sulfur iodide solid electrolyte according to claim 1.

11. A preparation method of the all-solid-state battery according to claim 10, comprising the following steps:
   (a) mixing a positive electrode active material, the doped lithium phosphorus-sulfur iodide solid electrolyte and a conductive agent, and ball-milling the same in an inert atmosphere, so as to obtain a composite positive electrode powder;

(b) subjecting the composite positive electrode powder obtained in step (a) to a first tableting, then adding the doped lithium phosphorus-sulfur iodide solid electrolyte, and performing a second tableting, so as to obtain a composite positive electrode/electrolyte sheet, and attaching a lithium sheet on the sheet, and assembling the same, so as to obtain the all-solid-state battery.

12. The preparation method according to claim 11, wherein in step (a), a part by weight of the positive electrode active material is 10-80 parts, a part by weight of the doped lithium phosphorus-sulfur iodide solid electrolyte is 5-50 parts and a part by weight of the conductive agent is 5-80 parts.

13. The preparation method according to claim 11, wherein in step (b), the composite positive electrode powder and the doped lithium phosphorus-sulfur iodide solid electrolyte have a mass ratio of (3-100):1, optionally (5-20):1.

14. The preparation method according to claim 11, wherein the positive electrode active material in step (a) comprises any one or a combination of at least two of sulfur, lithium iron phosphate, lithium cobaltate or lithium nickel manganese cobalt oxide;

optionally, the conductive agent in step (a) comprises any one or a combination of at least two of a conductive carbon black, a graphite powder or a Cabot carbon black;

optionally, a gas of the inert atmosphere in step (a) comprises any one or a combination of at least two of argon, nitrogen or helium;

optionally, a rotation speed of the ball-milling in step (a) is 10-350 rpm, optionally 100-300 rpm;

optionally, a time of the ball-milling in step (a) is 1-10 h, optionally 3-8 h.

15. The preparation method according to claim 11, wherein pressures of the first tableting and the second tableting in step (b) are independently 20-300 MPa, optionally 50-200 MPa.

* * * * *